United States Patent [19]

Koh et al.

[11] Patent Number: 5,562,943

[45] Date of Patent: * Oct. 8, 1996

[54] SALT COMPOSITIONS

[76] Inventors: Hen-Sik Koh, 1-21-1 Zeze, Ohtsu, Japan, 520; Yoshikazu Kawashima, 99 Fushio, Ikeda, Japan, 563; Takayuki Hashimoto, 2587 Komuro, Funabashi, Japan, 271

[ * ] Notice: The term of this patent shall not extend beyond the expiration date of Pat. No. 5,562,942.

[21] Appl. No.: 288,952

[22] Filed: Aug. 11, 1994

[30] Foreign Application Priority Data

Jan. 12, 1994 [JP] Japan .................................. 6-001543

[51] Int. Cl.$^6$ .................................................. A23L 1/237
[52] U.S. Cl. .................................................. 426/649; 426/650
[58] Field of Search ...................................... 426/649, 650

[56] References Cited

U.S. PATENT DOCUMENTS

| | | | |
|---|---|---|---|
| 2,601,112 | 6/1952 | Freedman | 426/649 |
| 2,968,566 | 1/1961 | Frank et al. | 426/649 |
| 3,514,296 | 5/1970 | Eguchi | 426/650 |
| 3,891,544 | 6/1975 | Becker et al. | 209/166 |
| 4,068,006 | 1/1978 | Moritz | 426/649 |
| 4,107,346 | 1/1978 | Kravitz | 426/648 |
| 4,243,691 | 8/1978 | Mohlenkamp | 426/649 |
| 4,399,164 | 1/1981 | Lauck et al. | 426/583 |
| 4,963,387 | 10/1990 | Nakagawa | 426/649 |

*Primary Examiner*—Arthur L. Corbin
*Attorney, Agent, or Firm*—Burgess, Ryan and Wayne

[57] ABSTRACT

A salt composition is provided for preventing excess intake of salt (sodium chloride) and achieving a well balanced intake of minerals. The composition which is used in the place of conventional table salt consists essentially of 100 parts by weight of a mixture containing 30 to 75% by weight of sodium chloride and 25 to 70% by weight of sylvinite admixed with 5 to 60 parts by weight of a citrate. Seasonings, such as soybean paste and soy sauce, and foods, such as pickles and kimchi, can be prepared with such a salt composition.

10 Claims, No Drawings

SALT COMPOSITIONS

BACKGROUND OF THE INVENTION

1. Field of the Invention

The present invention relates to novel salty-taste or salting compositions that can take the place of conventionally used salt or table salt. This invention is also concerned with salty-taste or salting seasonings or condiments wherein the salt compositions are added to conventional seasonings.

2. Background Art

Salt or table salt as used hitherto consists of approximately 100% of sodium chloride. It has long been pointed out that the Japanese people tend to take too much salt owing to the intake of the traditional Japanese foods, inclusive of soybean paste, soy sauce and pickles, which are prepared with large quantities of salt.

Sodium chloride itself is in no way harmful or hazardous to the human body but rather supplies Na (sodium) and Cl (chlorine) that are requisite for maintenance of the physiological functions of the human body. As is well known, however, a serious problem of imbalance is often encountered in the intake between sodium and potassium in high sodium but low-potassium diets, which imbalance has mainly been the cause of hypertension that is of grave concern in the diseases of adult people.

Consequently, it is strongly recommended to have the restricted intake of salt. But the poorly salt-seasoned dishes prepared with a reduced amount of salt do not taste good, thus diminishing one's appetite. For the purpose of reducing the salt intake, while maintaining a proper degree of salty taste, it has been proposed to use potassium chloride as a partial replacement for table salt. Nevertheless, potassium chloride possesses particular bitterness, and when added to foods, it severely spoils and impairs their tastes. A variety of countermeasures were devised so as to eliminate the bitterness of potassium chloride: for example, the addition of calcium chloride or magnesium chloride was reported in the Japanese Patent Publication No. 15299/1985. Yet, all of them to date have turned out to be far from being satisfactory.

SUMMARY OF THE INVENTION

This invention has as an object to provide the salty-taste or salting compositions which even when used in reduced quantities, can permit appropriate salty seasoning as is the case with the sole use of table salt and also provide improved flavor that excels those of the conventionally known replacement products for salt. Also, an objective of this invention is to enable a better balanced intake of minerals and to contribute to both the improvement of a person's diet and the promotion of ones health.

The present inventors conducted extensive research and found that as a means of supplementing potassium chloride to reduce the content of sodium chloride, while eliminating its bitterness, sylvinite can be utilized and also citrates can be added to table salt, thereby achieving the desired objects.

Thus, the present invention provides salty-taste or salting compositions which comprise 100 parts by weight of a mixture containing 30 to 75 weight % of salt and 25 to 70 weight % of sylvinite being admixed with 5 to 60 parts by weight of a citrate.

DETAILED DESCRIPTION OF THE PREFERRED EMBODIMENTS

In the salt compositions of the present invention, the weight ratio of sodium chloride to sylvinite should be maintained within the range of 75:25 to 30:70. In cases where sylvinite is used in proportions greater than 70 weight %, the bitterness of potassium chloride contained is difficult to be eliminated, and when sylvinite is utilized at ratios of less than 25 weight %, the resulting composition of necessity produces the diminished salt-reducing effect. A sole mixture of salt with potassium chloride still shows the particular undesired bitterness, and according to the present invention, such bitterness can be eliminated by the addition of a citrate. In this case, less than 5 parts by weight of such citrate against 100 parts by weight of the mixture of salt with sylvinite fails to eliminate the bitterness, while greater than 60 parts by weight results in reduction in salty taste, providing foods with flavor of a different nature from that of table salt, and it is not desirable to add a citrate at ratios of less than 5 or greater than 60 parts by weight against 100 parts by weight of the mixture of salt and sylvinite.

Referring to the salt as employed in the present invention, there can be used conventional table salt as well as rock salt, natural salt manufactured from the sea water by the solar vaporization process or the salt pond process, and the like.

The term "sylvinite" as used in the salty-taste or salting composition of the present invention is understood to mean a mineral composition which, as obtained by concentrating the mother liquor after extraction of salt from the sea water to thereby allow precipitation, is an edible, natural salty-taste or salting seasoning with the following typical makeup or composition: 17 weight % of NaCl, 75 weight % of KCl, 0.4 weight % of $CaCl_2$, 0.8 weight % of $CaSO_4$, 0.9 weight % of $MgCl_2$ and the rest water and salts of trace minerals. It has been identified and published as a generic term.

The salty-taste or salting composition of the present invention also contains a citrate. Examples of a citrate which can be used in the functional salty-taste or salting composition of the present invention, includes trisodium citrate, tripotassium citrate, calcium citrate and magnesium citrate. In the salty-taste or salting composition of the present invention, trisodium citrate and/or tripotassium citrate are utilized as a major ingredient, with calcium citrate and magnesium citrate being used if required from the standpoint of well balanced intake of minerals.

Citric acid is a metabolite generated in the citric acid cycle (also referred to as TCA cycle) which is one of the metabolic cycles in the human body, and the intake of citric acid is said to continue to maintain the acid-alkali balance, keep the body fluid and blood at the weakly alkaline pH value of 7.4 and improve the three major functions of the human body, of digestion, absorption and metabolism. Trisodium citrate is found to produce a preventive effect against blood clotting and has been used extensively in a wide variety of pharmaceuticals as a function-improving agent for circulatory organs, while potassium citrate is recognized to achieve diuretic and hypotensive effects, with the license being expected to be approved shortly by the Ministry of Health and Welfare for the manufacture of potassium citrate as a pharmeutical. The functional salty-taste or salting composition of the present invention, with the citrate formulated therein, not only serves a useful purpose to preserve good health but also produces the striking effect in eliminating the bitterness of potassium chloride created by formulating a decreased amount of table salt.

The salty-taste or salting composition of the present invention can be used, as a salting ingredient in place of conventionally used salt, in the manufacture of seasonings such as soybean paste and soy sauce; the salty-taste or salting composition can be added in proportions of 10 to 25 parts by weight against 100 parts by weight of a starting material to produce novel salting seasonings which have well balanced contents of minerals. Such salting seasonings are also included in the scope of this invention.

Furthermore, the salty-taste or salting composition of the present invention is employable, as a replacement for conventionally used table salt, in the preparation of such foods as pickles and kimchi, and the resultant novel food products having a well-balanced content of minerals are also included within the scope of this invention.

The salty-taste or salting composition of this invention can additionally be admixed with ordinary natural seasonings (for example, natural bases for soup stock, dried bonito, dried small sardines, tangle, mushrooms, meat extracts, etc.) and other seasonings such as amino-acid based ones (for example, monosodium L-glutamate etc.), nucleic acid based seasoning (for example, sodium 5'-guanylate, sodium 5'inosinate, etc.) and citrate based ones (for example, citric acid, citrates, etc.) as well as flavor-intensifying agents and fortifying agents such as vitamins and minerals.

A large number of papers have been published so far on the animal experiments and human clinical trials, demonstrating that the diet with Na/K ratio of less than 1 can prevent hypertension and contribute to cure the disease. Also, "Guidance on Diets for Promoting Health" published under the supervision of the Ministry of Health and Welfare of the Japanese Government sets forth the salt restriction as well as the balanced intake of essential minerals as an important item of guidance. The salty-taste or salting composition of the present invention can have its Na/K ratio adjusted to 1 or less than 1, while retaining the same degree of salty taste as conventional table salt, and can be said to be an ideal composition in terms of balanced intake of minerals. The salty-taste or salting composition of this invention, when taken consecutively, and the seasonings (for example, soybean paste, soy sauce, etc.) and food products (for example, pickles, kimchi, etc.) as prepared with the salty-taste or salting composition of this invention, when eaten habitually, can permit hypertension to be prevented or cured.

In summarizing the above, the salty-taste or salting composition of the present invention can exhibit the following physiological effects:

(1) The salty-taste or salting composition of the present invention tastes salty to almost the same degree as sodium chloride (table salt) alone, and when the composition is eaten in place of sodium chloride (table salt), the intake of salt can be reduced.

(2) Sylvinite supplies the human body with potassium, calcium and magnesium, resulting in the well balanced intake of minerals other than sodium. Among others, sylvinite supplies potassium to thereby maintain the intake sodium/potassium intake ratio adjusted to 1 or less.

(3) Trisodium citrate and tripotassium citrate exhibit enhanced flavor-intensifying activities, and supply the human body with citric acid, which, in turn, causes the functions of the human body to be advanced and also brings about improvement of circulation, while keeping the sodium/potassium ratio of the composition adjusted to 1 or less.

The present invention is illustrated in more detail on the basis of the examples but this invention is not understood to be limited to such examples.

EXAMPLE 1

Table salt (45 g), sylvinite (30 g) and tripotassium citrate (25 g) were mixed to give a functional salty-taste or salting composition (100 g).

The composition was rich in flavor and mild in salty taste.

The composition, as a salting material, was added to cucumber at a ratio of 6 weight % to prepare freshly salted pickle or cucumber.

The pickled cucumber was tasted for evaluation by 50 subjects, all of whom rated the pickle with having a better flavor than the counterpart prepared with conventional table salt.

The salty-taste or salting composition as obtained by the above procedure was subjected to analysis for major components to make comparison with ordinary table salt, with the results being shown in the following table:

| Results of analysis, in mg/100 g of sample | | |
|---|---|---|
| Component | Table Salt | The salting composition of the present invention |
| Sodium | 39,000 | 19,500 |
| Potassium | 130 | 20,781 |
| Calcium | 30 | 84 |
| Magnesium | 0 | 81 |
| Chlorine | 60,000 | 42,495 |
| Sulfuric acid | 0 | 185 |
| Citric acid | 0 | 15,717 |
| Water and misc. | 840 | 1,290 |
| Total | 100,000 | 100,000 |

The above results indicate clearly that the salty-taste or salting composition of this invention has a well balanced content of minerals, among others, with its Na/K ratio being less than 1.

EXAMPLES 2 THROUGH 5 AND COMPARATIVE EXAMPLES 1 THROUGH 4

Table salt, sylvinite and citrates as used in Example 1 were formulated and mixed in the quantities as shown in Table 1 to prepare different salt compositions, which were investigated for flavoring property and Na/K ratio.

TABLE 1

| Formulated amounts of salt composition ingredients, in g | | | | |
|---|---|---|---|---|
| | Example | | | |
| Ingredient | Ex. 2 | Ex. 3 | Ex. 4 | Ex. 5 |
| Table salt | 75 | 60 | 30 | 30 |
| Sylvinite | 25 | 40 | 70 | 70 |
| Trisodium citrate | — | — | 30 | 5 |
| Tripotassium citrate | 60 | 30 | — | — |
| Na/K ratio (*) | 0.95 | 0.97 | 0.89 | 0.65 |
| Flavoring | *1 | *1 | *1 | *2 |

| | Example | | | |
|---|---|---|---|---|
| Ingredient | Comp. Ex. 1 | Comp. Ex. 2 | Comp. Ex. 3 | Comp. Ex. 4 |
| Table salt | 90 | 20 | 60 | 60 |
| Sylvinite | 10 | 80 | 40 | 40 |
| Trisodium citrate | — | — | — | — |
| Tripotassium citrate | 30 | — | — | 70 |
| Na/K ratio (*) | 2.35 | 0.67 | 1.67 | 0.65 |
| Flavoring | *1 | *3 | 3*+ | 4* |

Notes:
*Calculated on an anhydride basis.
*1: Salty taste with rich flavor.
*2: Salty taste with slight bitterness.
*3: Strongly bitter taste.
*4: Slight in salty taste, given strange flavor.

As is obvious from Table 1, eliminating the bitterness of potassium chloride (refer to Example 3 and Comparative Example 3), even when the citrate is added, if a content of sylvinite is not less than 70 weight %, the resultant salt composition develops bitterness (refer to Example 5 and Comparative Example 2). Accordingly, as the addition rate of a citrate is increased, the resultant composition becomes less salty and has a different flavor (refer to Example 3 and Comparative Example 4). Salt when formulated at ratios in excess of 75 weight % yields well preserved salty taste but produces the salt compositions with Na/K ratio of not less than 1, which are entirely distinct from what is intended by the salt composition of this invention (refer to Comparative Example 1).

EXAMPLE 6

30 parts by weight of a steam-cooked mixture of defatted soybean and soybean (7:3 in weight ratio) and 20 parts by weight of parched wheat are mixed, and the mixture was admixed with seed Koji malt to prepare soy sauce Koji malt. A portion (7 kg) of the soy sauce Koji malt was admixed with the solution of salt (3 kg) and the salt composition (3.6 kg) having the composition as described in Example 1 in water (12 liters), followed by maturation in accordance with the conventional procedure to prepare soy sauce. The soy sauce was analyzed, and its analytical results are shown in Table 2, along with those for the conventional soy sauce prepared with ordinary table salt for the purposes of comparison.

TABLE 2

Analytical results of two kinds of soy sauce, in weight %.

| Item of analysis | Soy sauce prepared with table salt | Soy sauce prepared with the composition of Example 1 |
| --- | --- | --- |
| Total nitrogen | 1.84 | 1.86 |
| Extract | 21.00 | 21.50 |
| Alcohols | 1.07 | 1.05 |
| pH | 5.00 | 5.02 |
| Sodium | 5.77 | 3.74 |
| Potassium | 0.40 | 4.22 |
| Citric Acid | 0.26 | 2.72 |

Two kinds of soy sauce were tested for evaluation by 50 subjects, all of which rated the soy sauce prepared with the salting composition of the present invention as having a better flavor than the one prepared with ordinary table salt.

The soy sauce as prepared with the salting composition of this invention not only offers better flavor but also shows a content of sodium approximately equal to the one of the low-salt soy sauce, a Na/K ratio of less than 1 and a considerably high content of citric acid, thus being suited for the prevention and therapy of the diseases of adult people such as hypertension.

We claim:

1. A functional salty-taste or salting edible composition which consists essentially of 100 parts by weight of a mixture consisting of 30 to 75 weight % of sodium chloride and 25 to 70 weight % of sylvinite and 5 to 60 parts by weight, based on 100 parts by weight of the mixture, of at least one citrate, and wherein the sodium/potassium ion ratio is less than 1.

2. The composition as claimed in claim 1, wherein the citrate is a mixture of tripotassium citrate and trisodium citrate.

3. The composition as claimed in claim 1, which additionally contains at least one flavor intensifying agent selected from the group consisting of natural seasonings, amino-acid based seasonings, nucleic-acid based seasonings and citrate based seasonings.

4. The composition as claimed in claim 3, which additionally contains at least one fortifying agent selected from the group consisting of vitamins and minerals.

5. A seasoning composition containing the salt composition of claim 1.

6. The seasoning composition as claimed in claim 5 which is soybean paste.

7. The seasoning composition as claimed in claim 5 which is soy sauce.

8. A food prepared with the salt composition of claim 1.

9. The food as claimed in claim 8 which is a pickle.

10. The food as claimed in claim 8 which is kimchi.

* * * * *